United States Patent
Han et al.

(10) Patent No.: US 9,903,317 B2
(45) Date of Patent: Feb. 27, 2018

(54) CONTROL APPARATUS OF ENGINE HAVING TURBOCHARGER AND METHOD THEREOF

(71) Applicant: Hyundai Motor Company, Seoul (KR)

(72) Inventors: Dong Hee Han, Seoul (KR); Kwanhee Choi, Seoul (KR); Hyun Jun Lim, Incheon (KR); Nahm Roh Joo, Yongin-si (KR); Yoon Joo Kim, Yongin-si (KR); Kiwon Park, Seoul (KR); Joowon Lee, Gwangju-si (KR); Jong Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 13 days.

(21) Appl. No.: 14/339,208

(22) Filed: Jul. 23, 2014

(65) Prior Publication Data
US 2015/0176535 A1 Jun. 25, 2015

(30) Foreign Application Priority Data

Dec. 23, 2013 (KR) .................. 10-2013-0161449

(51) Int. Cl.
*F02M 25/07* (2006.01)
*F02B 47/08* (2006.01)
(Continued)

(52) U.S. Cl.
CPC ......... *F02M 25/0706* (2013.01); *F02B 47/08* (2013.01); *F02D 23/00* (2013.01);
(Continued)

(58) Field of Classification Search
CPC ........ F02D 41/007; F02D 23/00; F02D 23/02; F02D 41/002
(Continued)

(56) References Cited

U.S. PATENT DOCUMENTS 5,992,386 A * 11/1999 Nytomt ................ F02D 35/021
123/406.34
7,461,633 B2 * 12/2008 Vangraefschepe ...... F02D 35/02
123/434
(Continued)

FOREIGN PATENT DOCUMENTS

CN 103133162 A 6/2013
JP 56-138435 A 10/1981
(Continued)

*Primary Examiner* — Ngoc T Nguyen
(74) *Attorney, Agent, or Firm* — Morgan, Lewis & Bockius LLP

(57) ABSTRACT

A control apparatus of an engine having a turbocharger may include the engine generating power by combustion of a fuel, the turbocharger including a turbine operated by exhaust gas of the engine and a compressor connected to the turbine by a rotating shaft, and thus supercharging air to a combustion chamber provided in the engine by the compressor, a detecting sensor detecting pre-ignition in the combustion chamber of the engine, and a controller controlling supercharging pressure supplied to the combustion chamber by using a required torque, ignition timing of the combustion chamber, and an air-fuel ratio, and thus controlling the pre-ignition in the combustion chamber, when the pre-ignition in the combustion chamber may be detected by the detecting sensor.

8 Claims, 3 Drawing Sheets

(51) Int. Cl.
*F02D 23/00* (2006.01)
*F02D 35/02* (2006.01)
*F02D 41/00* (2006.01)
*F02D 41/22* (2006.01)

(52) U.S. Cl.
CPC ....... *F02D 35/027* (2013.01); *F02D 41/0007* (2013.01); *F02D 2041/227* (2013.01); *Y02T 10/144* (2013.01)

(58) Field of Classification Search
USPC .................................. 60/601, 611; 701/103
See application file for complete search history.

(56) References Cited

U.S. PATENT DOCUMENTS

| | | | |
|---|---|---|---|
| 9,719,436 B2* | 8/2017 | Glugla ................ | F02D 41/0007 |
| 2003/0089337 A1 | 5/2003 | Cohn et al. | |
| 2007/0000247 A1* | 1/2007 | Perkins ................ | F02B 33/443 |
| | | | 60/565 |
| 2011/0213538 A1* | 9/2011 | Amann .................. | F02D 37/02 |
| | | | 701/102 |
| 2011/0239986 A1* | 10/2011 | Shishime .............. | F02D 35/027 |
| | | | 123/406.29 |
| 2012/0029789 A1* | 2/2012 | Mehta .................. | F02D 37/02 |
| | | | 701/103 |
| 2012/0035835 A1* | 2/2012 | Glugla ................. | F02D 35/027 |
| | | | 701/111 |
| 2012/0316751 A1* | 12/2012 | Eastwood ................ | F01M 1/20 |
| | | | 701/102 |
| 2013/0035841 A1* | 2/2013 | Glugla .................... | F02D 41/22 |
| | | | 701/103 |
| 2013/0166184 A1* | 6/2013 | Wuerth .................. | F02D 41/22 |
| | | | 701/111 |
| 2013/0238223 A1* | 9/2013 | Fischer .............. | F02D 41/1438 |
| | | | 701/111 |
| 2013/0311064 A1* | 11/2013 | Suzuki ................... | F02D 41/22 |
| | | | 701/103 |

FOREIGN PATENT DOCUMENTS

| | | | | |
|---|---|---|---|---|
| JP | 63-105266 A | | | 5/1988 |
| JP | 01-100327 A | | | 4/1989 |
| JP | 04203330 A | | * | 7/1992 |
| JP | 7-301121 A | | | 11/1995 |
| JP | 2006-200415 A | | | 8/2006 |
| JP | 2006200415 A | | * | 8/2006 |
| JP | 2006-258048 A | | | 9/2006 |
| JP | 2006258048 A | | * | 9/2006 |
| JP | 2010-133367 A | | | 6/2010 |
| JP | 2012-225253 A | | | 11/2012 |
| JP | 2013-204447 A | | | 10/2013 |

* cited by examiner

CONTROL APPARATUS OF ENGINE HAVING TURBOCHARGER AND METHOD THEREOF

CROSS-REFERENCE TO RELATED APPLICATION

The present application claims priority to and the benefit of Korean Patent Application No. 10-2013-0161449 filed on Dec. 23, 2013, the entire contents of which is incorporated herein for all purposes by this reference.

BACKGROUND OF THE INVENTION

Field of the Invention

The present invention relates to a control apparatus of an engine having a turbocharger, and a method thereof. More particularly, the present invention relates to a control apparatus of an engine having a turbocharger and a method for preventing a driver from recognizing pre-ignition when pre-ignition occurs in a combustion chamber.

Description of Related Art

Generally, an engine of a vehicle generates power by combusting a mixture of fuel and air supplied from outside.

For combustion in the course of generating power by driving an engine, ambient air must be sufficiently supplied to obtain a desired output and combustion efficiency of the engine. Thus, in order to increase combustion efficiency and enhance output of an engine, a supercharger or a turbocharger that pressurizes air for combustion and supplies the pressurized air is applied to a vehicle.

The turbocharge is a device that rotates a turbine by using pressure of exhaust gas discharged from the engine, and thereafter increases output of the engine by supplying high pressure air to a combustion chamber by using rotational force thereof. The turbocharger has been applied to a diesel engine, and recently to a gasoline engine.

In the engine having the turbocharger, pre-ignition frequently occurs. The pre-ignition occurs when a mixed fuel is naturally ignited by overheating of a combustion chamber before the mixed fuel is ignited by spark at the end of the compression cycle in a gasoline engine. When the pre-ignition continuously occurs, output of the engine is deteriorated and knocking occurs so that the engine is damaged.

Also, the pre-ignition provides an uneasy feeling to a driver. Accordingly, the customer frequently complains about the running performance of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control apparatus of an engine having a turbocharger that suppresses pre-ignition quickly when the pre-ignition occurs.

Further, the present invention minimizes torque variation of the engine such that a driver cannot perceive the pre-ignition when the pre-ignition is suppressed.

In an aspect of the present invention, a control apparatus of an engine having a turbocharger, may include the engine generating a power by combustion of a fuel, the turbocharger including a turbine operated by exhaust gas of the engine and a compressor connected to the turbine by a rotating shaft, and thus supercharging air to a combustion chamber provided in the engine by the compressor, a detecting sensor detecting pre-ignition in the combustion chamber of the engine, and a controller controlling supercharging pressure supplied to the combustion chamber by using a required torque, ignition timing of the combustion chamber, and an air-fuel ratio, and thus controlling the pre-ignition in the combustion chamber, when the pre-ignition in the combustion chamber is detected by the detecting sensor.

The controller increases the air-fuel ratio when the pre-ignition is suppressed by adjusting the supercharging pressure supplied to the combustion chamber.

The controller changes the engine to a limp home mode when the pre-ignition is not suppressed by control of the supercharging pressure supplied to the combustion chamber.

In another aspect of the present invention, a control method of an engine having a turbocharger, may include detecting whether pre-ignition occurs in a combustion chamber of the engine by a detecting sensor, enriching a supply of fuel to the combustion chamber when the pre-ignition occurs in the combustion chamber of the engine, by a controller, and adjusting a supercharging pressure of air supplied to the combustion chamber by using a required torque, ignition timing, and an air-fuel ratio, by the controller.

The control method may further include determining whether the pre-ignition in the combustion chamber is suppressed by the controller, and increasing the air-fuel ratio to a predetermined value when the pre-ignition is suppressed, by adjusting the supercharging pressure of air supplied to the combustion chamber by the controller.

The control method may further include changing the engine to a limp home mode when the controller determines that the pre-ignition is not suppressed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
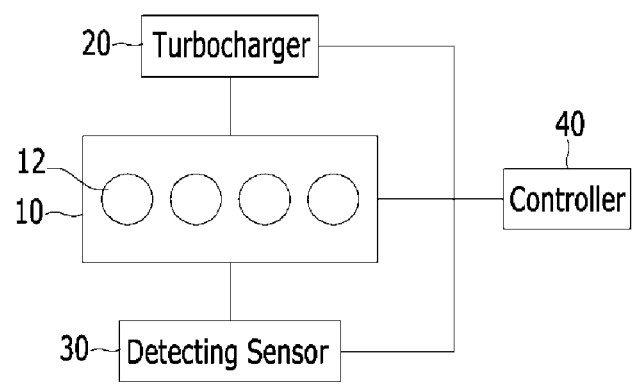
FIG. 1 is a block diagram illustrating a control apparatus of an engine having a turbocharger according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

A control apparatus of an engine having a turbocharger according to an exemplary embodiment of the present invention will now be described with reference to the accompanying drawings.

FIG. 1 is a block diagram illustrating a control apparatus of an engine having a turbocharger according to an exemplary embodiment of the present invention.

As shown in FIG. 1, a control apparatus of an engine having a turbocharger according to an exemplary embodiment of the present invention includes an engine 10 generating power by combustion of a fuel, a turbocharger 20 supplying compressed air to a combustion chamber 12 of the engine 10, a detecting sensor 30 detecting whether pre-ignition is occurring in the combustion chamber 12, and a controller 40 controlling the pre-ignition occurring in the combustion chamber 12.

The turbocharger 20 includes a turbine operated by exhaust gas and a compressor connected to the turbine by a rotating shaft. The compressor compresses external air and supplies compressed air to the combustion chamber 12 of the engine 10.

The detecting sensor 30 is provided in the combustion chamber 12 of the engine 10 to detect pre-ignition. The detecting sensor 30 provides a detected signal to the controller 40.

When the controller 40 detects that the pre-ignition is occurring in the combustion chamber 12 by the detecting sensor 30, the controller 40 adjusts supercharging pressure supplied to the combustion chamber 12 by using required torque, ignition timing of the combustion chamber 12, and an air-fuel ratio.

The controller 40 can be realized by one or more processors activated by a predetermined program, and the predetermined program can be programmed to perform each step of a control method of an engine having a turbocharger according to an exemplary embodiment of this invention.

The controller 40 enriches the fuel supplied to the combustion chamber 12 of the engine 10 when the pre-ignition occurs in the combustion chamber 12. That is, when a large amount of fuel is supplied to the combustion chamber 12 instantaneously, the temperature of the combustion chamber 12 is decreased. Therefore, the pre-ignition in the combustion chamber 12 can be suppressed.

Meanwhile, when a large amount of fuel is supplied to the combustion chamber 12 instantaneously, torque of the engine is rapidly increased. When the torque of the engine is rapidly increased, a driver perceives that the pre-ignition in the combustion chamber 12 occurs. When the pre-ignition occurs continuously, the driver has dissatisfaction about the performance of the vehicle.

Thus, it is necessary to adjust the pressure of the compressed air supplied to the combustion chamber 12. A supercharging pressure supplied to the combustion chamber 12 is determined by required torque, ignition timing, and an air-fuel ratio.

At this time, a torque variation of the engine is controlled when the supercharging pressure is properly controlled by the controller 40. Since the torque variation of the engine is minimized by the controller 40, the driver cannot perceive that the pre-ignition occurs.

Here, the air-fuel ratio (lambda) means a weight ratio of air and fuel (air weight/fuel weight). As the air-fuel ratio is increased, the weight ratio of air is increased. This is means that amount of fuel is relatively rarefied. In contrast, as the air-fuel ratio is decreased, the weight ratio of air is decreased. This is means that amount of fuel is relatively dense.

Hereinafter, a control method of an engine having a turbocharger according to an exemplary embodiment of the present invention will be described.

Figure 2:
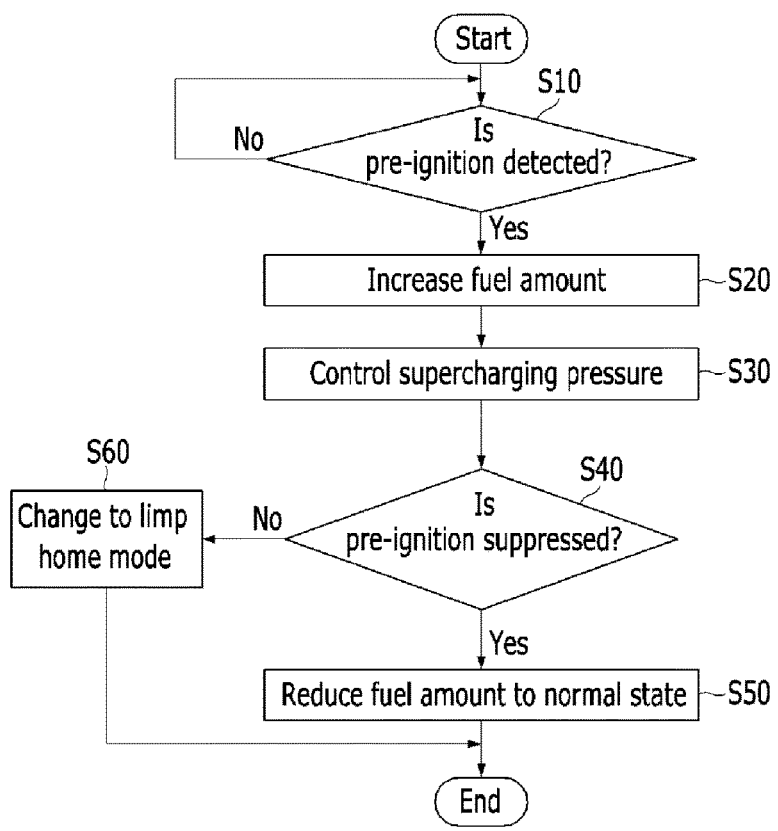
FIG. 2 is a flowchart illustrating a control method of an engine having a turbocharger according to an exemplary embodiment of the present invention.

FIG. 2 is a flowchart illustrating a control method of an engine having a turbocharger according to an exemplary embodiment of the present invention.

As shown in FIG. 2, the detecting sensor 30 detects whether the pre-ignition occurs at step S10.

When the pre-ignition occurs in the combustion chamber 12 of the engine 10, the amount of fuel supplied to the combustion chamber 12 is increased at step S20. As such, when the amount of fuel supplied to the combustion chamber 12 is instantaneously increased, the temperature of the combustion chamber 12 is decreased. Thus the pre-ignition can be suppressed.

The controller 40 controls supercharging pressure of air supplied to the combustion chamber 12 by using required torque, ignition timing, and an air-fuel ratio at step S30. A torque variation of the engine can be minimized by controlling the supercharging pressure supplied to the combustion chamber 12.

When the torque of the engine is rapidly increased, the driver perceives that the pre-ignition occurs. Thus the controller 40 controls that torque variation of the engine to be minimized by adjusting the supercharging pressure of the air supplied to the combustion chamber 12. As a result, the driver cannot perceive that the pre-ignition occurs.

The controller 40 determines whether the pre-ignition is suppressed at step S40. Suppression of the pre-ignition can be determined from the detection signal of the detecting sensor 30.

The controller 40 reduces the fuel amount supplied to the combustion chamber 12 to a normal state when the pre-ignition occurring in the combustion chamber 12 is suppressed at step S50. That is, the controller 40 determines that the engine is normalized and controls the engine in a normal state.

The controller 40 determines that the engine is in an abnormal state when the pre-ignition is not suppressed in spite of controlling the fuel enrichment and supercharging pressure supplied to the combustion chamber 12. The controller 40 then changes the engine to a limp home mode and controls the engine in the limp home mode at step S60. As such, the controller 40 changes the engine to the limp home mode, and thereby damage to the engine can be prevented and safety of the driver can be guaranteed.

The limp home mode is a substitution mode for preventing safety of a driver from being undermined due to a sudden stop of an engine caused by malfunction of parts. The controller 40 limits a vehicle speed to approximately 60 to 80 km/h or less in the limp home mode, and keeps the RPM of the engine at approximately 1500 to 2000 rpm which is higher than a general level even when the vehicle is in an idle stop state.

Hereinafter, a control method of an engine having turbocharger according to an exemplary embodiment of the present invention will be described referring to FIG. 3.

Figure 3:
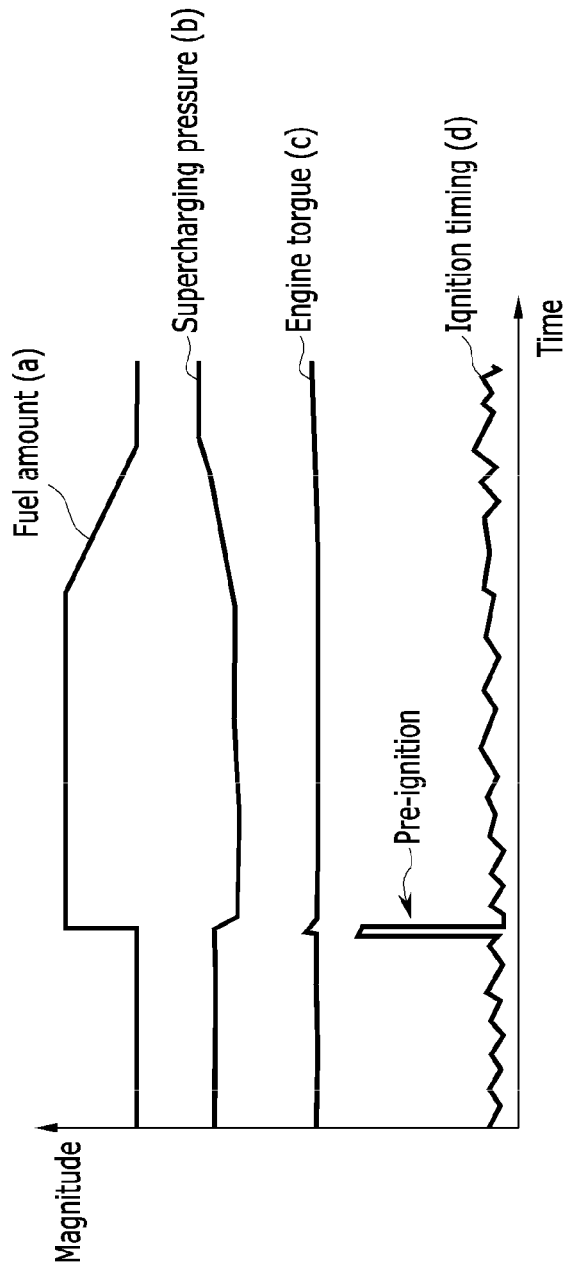
FIG. 3 is a graph illustrating a control signal according to an exemplary embodiment of the present invention.

As shown in FIG. 3, the controller 40 supplies a large amount of fuel to the combustion chamber 12 instantaneously in order to decrease the temperature of the combustion chamber 12 (refer to FIG. 3 (*a*) line) when the pre-ignition is detected in the combustion chamber 12 of the engine 10 (refer to FIG. 3 (*d*) line).

In order to prevent a rapid torque variation caused by the large amount of fuel supplied to the combustion chamber 12, the controller 40 controls a supercharging pressure of air supplied to the combustion chamber 12 (refer to FIG. 3 (*b*) line).

As such, torque variation of the engine is minimized by control of fuel amount and supercharging pressure supplied to the combustion chamber 12 (refer to FIG. 3 (*c*) line). Thereby the driver cannot perceive that the pre-ignition has occurred.

When the pre-ignition is suppressed, the controller 40 gradually reduces the fuel amount to an original state and restores the supercharging pressure of air to the original state.

According to an exemplary embodiment of the present invention, torque variation of an engine can be minimized by adjusting supercharging pressure according to fuel amount supplied to a combustion chamber. Since torque variation of an engine is minimized, a driver cannot perceive that pre-ignition has occurred.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A control method of an engine having a turbocharger, comprising:
    detecting whether pre-ignition occurs in a combustion chamber of the engine by a detecting sensor; and
    enriching fuel supplied to the combustion chamber and then adjusting supercharging pressure supplied to the combustion chamber when the pre-ignition occurs in the combustion chamber of the engine,
    wherein the supercharging pressure is adjusted to minimize a torque variation of the engine.

2. The control method of the engine having the turbocharger of claim 1, further comprising:
    adjusting the supercharging pressure based on a required torque, ignition timing of the combustion chamber, and an air-fuel-ratio.

3. The control method of the engine having the turbocharger of claim 2, further comprising:
    determining, by the controller, whether the pre-ignition in the combustion chamber is suppressed; and
    increasing, by the controller, the air-fuel ratio to a predetermined value so as to suppress the pre-ignition while adjusting the supercharging pressure of air supplied to the combustion chamber.

4. The control method of the engine having the turbocharger of claim 1, further comprising:
    changing, by the controller, the engine to a limp home mode when the controller determines that the pre-ignition is not suppressed.

5. A control apparatus of an engine having a turbocharger, comprising:
    the engine generating a power by combustion of a fuel;
    the turbocharger including a turbine operated by exhaust gas of the engine and a compressor connected to the turbine by a rotating shaft, and thus supercharging air to a combustion chamber provided in the engine by the compressor;
    a detecting sensor detecting pre-ignition in the combustion chamber of the engine; and
    a controller configured to enrich fuel supplied to the combustion chamber by increasing an amount of the fuel supplied to the combustion chamber and then to adjust supercharging pressure supplied to the combustion chamber when the pre-ignition in the combustion chamber is detected by the detecting sensor,
    wherein the supercharging pressure is adjusted by the controller to minimize a torque variation of the engine.

6. The control apparatus of claim 5, wherein adjusts the supercharging pressure is adjusted based on a required torque, ignition timing of the combustion chamber, and an air-fuel-ratio.

7. The control apparatus of the engine having the turbocharger of claim 6,
    wherein the controller is configured to increase the air-fuel ratio to suppress the pre-ignition by adjusting the supercharging pressure supplied to the combustion chamber.

8. The control apparatus of the engine having the turbocharger of claim 5,
    wherein the controller is further configured to change the engine to a limp home mode when the pre-ignition is not suppressed by control of the supercharging pressure supplied to the combustion chamber.

* * * * *